Aug. 4, 1964  A. J. GALE  3,143,671
BRUSHLESS HIGH VOLTAGE D.C. ELECTROSTATIC MACHINE
Filed July 27, 1959  2 Sheets-Sheet 2

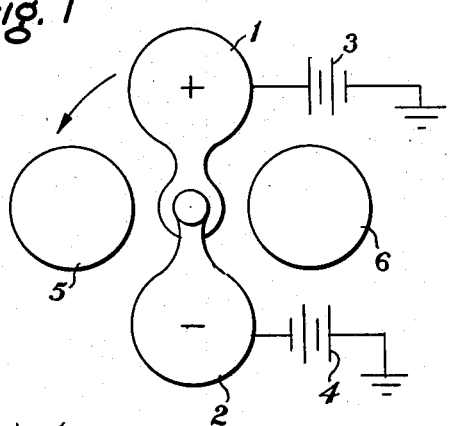
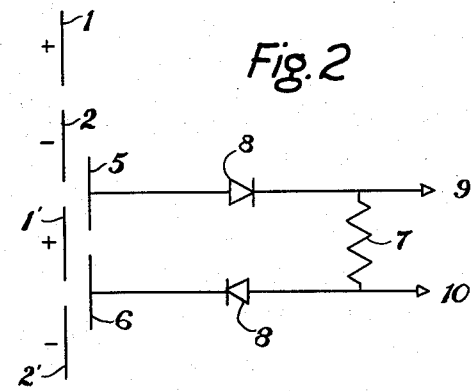
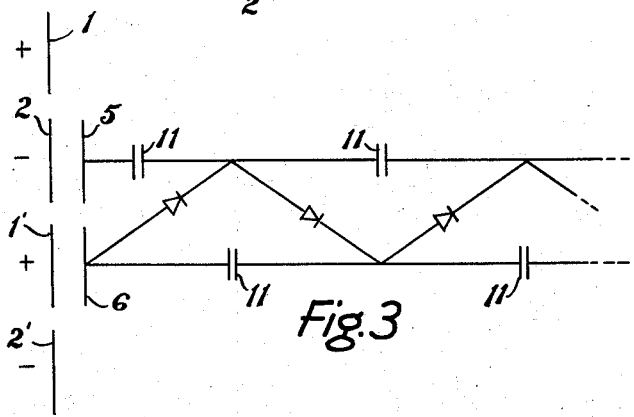
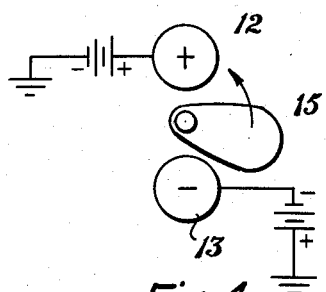
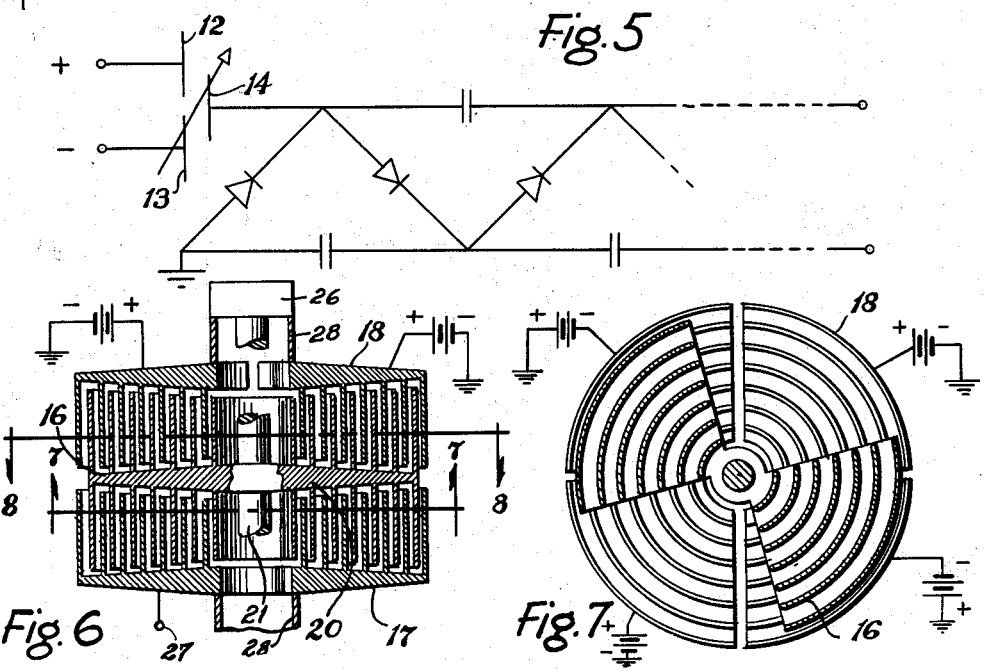
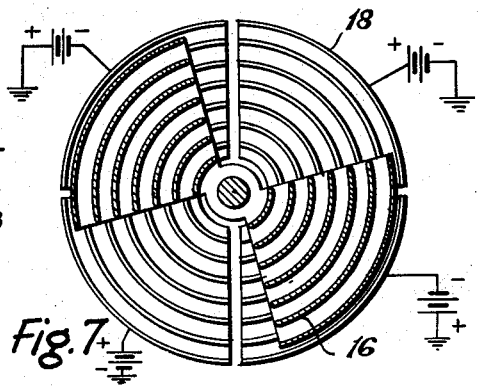

United States Patent Office 3,143,671
Patented Aug. 4, 1964

1

3,143,671
BRUSHLESS HIGH VOLTAGE D.C. ELECTRO-
STATIC MACHINE
Alfred J. Gale, Lexington, Mass., assignor to High Voltage
Engineering Corporation, Burlington, Mass., a corporation of Massachusetts
Filed July 27, 1959, Ser. No. 829,823
1 Claim. (Cl. 310—6)

This invention relates to the generation of high voltage D.C., and in particular to a brushless electrostatic charging device for such a high voltage D.C. machine.

In the generation of high voltage D.C. by electrostatic means, electric charge is transferred by a moving charge conveyor from ground to a high voltage terminal. The charge conveyor in some devices is an insulating belt, in other devices it is a sectored disk of conductive material, and in still other devices it may comprises an insulating belt having conducting zones thereon. Various methods of applying the charge to the charge conveyor have also been utilized. In the conventional electrostatic belt-type generator a corona discharge is used; and, in certain specialized types of electrostatic belt-type generators wherein the belt includes conductive zones, the charge is induced on the conductive zones of the belt at the time it comes in contact with a pulley at the grounded end of the device, and the charge transfer takes place by conduction. The former method requires a gas in order to support the corona discharge, and the latter arrangement is not capable of high current.

The present invention comprehends a charge transfer mechanism wherein capacitive effects are made use of between charged bodies and electrodes upon which charge is to be induced.

FIG. 1 is a diagram illustrating one form of the invention;

FIG. 2 is another diagram further illustrating the arrangement of FIG. 1;

FIG. 3 is another diagram showing a conventional Cockcroft-Walton circuit, with the exception that the conventional charging transformer has been replaced by a device of the type shown in FIGS. 1 and 2;

FIG. 4 is another diagram illustrating a modified form of the embodiment of the invention shown in FIG. 1;

FIG. 5 is another diagram showing a conventional Cockcroft-Walton circuit, with the exception that the conventional charging transformer has been replaced by a device of the type shown in FIG. 4;

FIG. 6 is a view in longitudinal section of an embodiment of the invention incorporating the principles shown by the diagram of FIG. 4;

FIG. 7 is a sectional view along the line 7—7 of FIG. 6;

Figure 8:
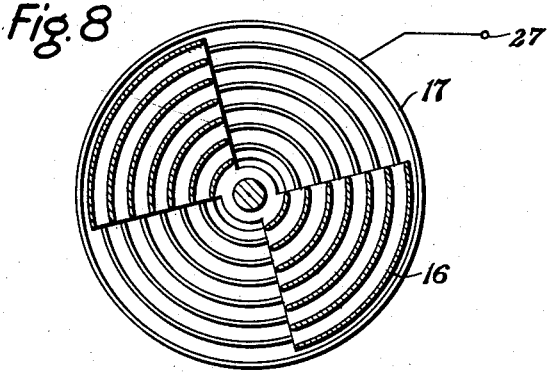
FIG. 8 is a sectional view along the line 8—8 of FIG. 6.

Referring to FIG. 1 of the drawings, therein is shown a rotor and a stator. The rotor comprises at least one rotor element and in FIG. 1 the rotor comprises two rotor elements 1, 2. Each rotor element 1, 2 has a charge thereon and in FIG. 1, one rotor element 1 is charged positively while the other element 2 is charged negatively. Power supplies 3, 4 are indicated for maintaining the charge on the rotor elements 1, 2 respectively, but it is to be understood that the charge on each rotor element 1, 2

2 is lost only by leakage since it is not necessary to transfer charge therefrom in order for the device to function as a charging mechanism. Thus even though the power sources 3, 4 may be connected to the rotor elements 1, 2 by means of brushes (not shown), such brushes would not be open to the normal objection since virtually no power is transferred through the brushes as would be the case if the brushes took part in the actual charge transfer.

Referring now to FIG. 2, it will be seen that the stator comprises two stator elements 5, 6 which are connected by a resistive path 7 which is connected in series with at least one rectifier 8 so that current can flow in only one direction between the two stator elements 5, 6. As has been stated, the rotor may comprise a number of elements, and for simplicity's sake, only two were shown in FIG. 1. In FIG. 2 four rotor elements 1, 2, 1', 2' are shown, and it is to be understood that this series could be continued. The essential features are that the rotor elements continue to pass by the vicinity of each of the two stator elements 5, 6, and that when a rotor element charged with one sign passes one stator element 5, a rotor element of opposite sign passes by the other stator element 6. When a positively charged rotor element 1 is opposite the upper stator element 5 and a negatively charged rotor element 2 is opposite the lower stator element 6, current will flow through the rectifiers 8 and the resistor 7, thereby giving rise to a D.C. potential across the resistor 7. When, on the other hand, a negatively charged rotor element 2 is opposite the upper stator element 5 and a positively charged rotor element 6 is opposite the lower stator element 5, the rectifiers 8 block current flow. Consequently, the output at the terminals 9, 10 from across the resistor 7 is a D.C. output.

The D.C. voltage of the device shown in FIGS. 1 and 2 may be amplified in any of a variety of ways. Referring to FIG. 3, when a negatively charged rotor element 2 is opposite the upper stator element 5, and a positively charged rotor element 1 is opposite the lower stator element 6, current flows through the chain of rectifiers 8 and charges the capacitances 11. When, on the other hand, a positive rotor element 1 is opposite the upper stator element 5 and a negative rotor element 2 is opposite the lower stator element 6, the rectifiers 8 block any current flow.

In the devices shown in FIGS. 1, 2 and 3, what might be called the "permanent" charge is on the rotor elements, and the function of the device is to induce charges on the stator elements. The reverse is also possible, wherein the "permanent" charge is on the stator elements, and such an arrangement is shown in FIGS. 4 and 5. Referring to FIGS. 4 and 5, for simplicity's sake the stator is shown as comprising only two stator elements, one 12 positively charged and the other 13 negatively charged. The electrode upon which charge is to be induced may be designated the charging electrode, since it charges the rest of the circuit, and is shown in FIG. 5 at 14. The charging electrode 14 is also stationary and the rotor 15 which is shown in FIG. 4 as a single element, rotates between the stator elements 12, 13 and the charging electrode 14. As the rotor 15 rotates, the capacitance between the charging electrode 14 and the stator elements 12, 13 is varied, thus varying the charge induced on the charging electrode 14 by the charges on the stator elements 12, 13. The function of the rotor element 15 is therefore to shield the charging electrode 14 alternately from each of the stator elements 12, 13. Alternatively the rotor element may itself constitute the charging electrode, in which event the capacitance between the charging electrode 14 and the stator elements 12, 13 is varied as the charging electrode 14 physically becomes alternately nearer to and more remote from each of the stator elements 12, 13. The circuit diagram of FIG. 5 is applicable to both cases, since the effect of the rotor element is represented by the symbol for a variable capacitance.

Figure 9:
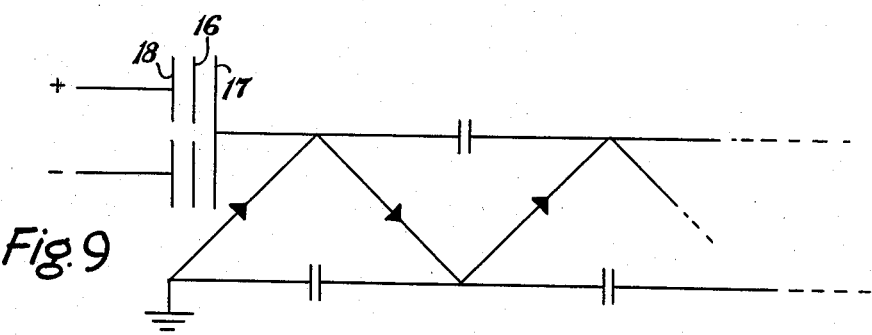
FIG. 9 is a circuit diagram showing a conventional Cockcroft-Walton circuit, with the exception that the conventional charging transformer has been replaced by a device of the type shown in FIGS. 6, 7 and 8.

FIGS. 6, 7 and 8 show a device in which the rotor elements serve as a shielding device between the charging electrode and the stator elements and FIG. 9 shows a circuit diagram illustrating how the device of FIGS. 6, 7 and 8 can be used to charge a Cockcroft-Walton circuit. Referring to FIGS. 6, 7 and 8, a rotor 16 is sandwiched between two stators 17, 18. The rotor 16 is supported upon a first shaft 21 and the stators 17, 18 are supported upon a second shaft 28. It will be noted that the second shaft 28 is hollow in order to accommodate the first shaft 21 and also is divided into two parts in order to accommodate the radial supporting member 20. One of the stators is a single piece 17, and the other of the stators is divided into quadrants 18. The quadrants 18 are alternately charged positively and negatively. The rotor 16 comprises only two of four possible quadrants, so that as it rotates it alternately shields the single-piece stator 17 from the positive charge and from the negative charge on the quadrants 18. Rotation of the rotor 16 by an appropriate motor 26 thus induces charges of opposite sign alternately on the single-piece stator 17. In this way, the single-piece stator 17 which is connected to an appropriate take-off terminal 27 can be used as a charging electrode for a Cockcroft-Walton circuit or other device, as shown in FIG. 9.

Figure 10:
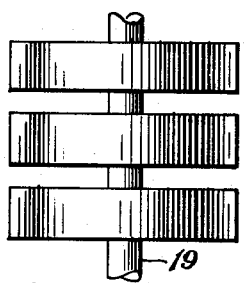
FIG. 10 is a diagram showing a series-connection of a plurality of devices of the type shown in FIGS. 6, 7 and 8.

Increased voltage output may be obtained by a series connection of a plurality of devices such as that shown in FIGS. 6, 7 and 8. Referring to FIG. 10, all such devices may be supported on a common shaft 19. If high current is desired rather than high voltage, the various generators shown in FIG. 10 may be connected in parallel rather than in series.

Figure 11:
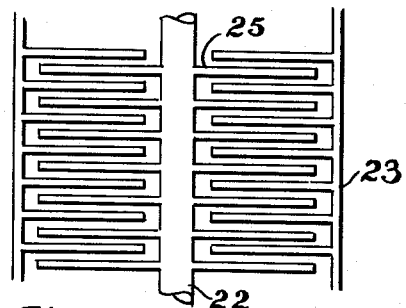
FIG. 11 is a view similar to that of FIG. 6 but showing an alternative construction less satisfactory than that shown in FIG. 6.

An important feature of the invention is the actual construction of the elements as shown in FIGS. 6, 7 and 8. The rotor 16 is constructed so that the radial supporting member 20 tapers away from the axis 21 to provide mechanical stability. This device has advantages over the conventional sectored disk type of electrostatic generator such as that shown in FIG. 11. In the device shown in FIG. 11, it is the axial tolerances that are critical and moreover there are axial electrostatic forces that tend to cause instability between the gap formed between the rotor 22 and stator 23. There are thus problems of axial play. In the device shown in FIGS. 6, 7 and 8, on the other hand, it is the diameters whose tolerances are critical, and it is easier to build diameters to tolerance than axial dimensions. Moreover, the fins 24 are more stable because of their circumferential construction, as compared with the lateral construction of the fins 25 shown in FIG. 11. In addition, in the device of FIGS. 6, 7 and 8 the electrostatic forces are radial rather than axial; thus axial play is permissible. Not only is the device of FIGS. 6, 7 and 8 mechanically strong in the radial direction, but these radial dimensions are much easier to make to close tolerances than the axial dimensions of the device shown in FIG. 11.

The charging generator of the invention has been described with reference to its use in a Cockcroft-Walton circuit. However, this charging generator is equally applicable to other devices and may be used, for example, as a charging mechanism for an electrostatic generator, either of the conventional belt-type or of the disk type disclosed and claimed in my co-pending application, Serial No. 713,050, now Patent No. 3,039,011. In such a disk-type generator the charging generator of the present invention as well as the principal voltage generator would be of comparable construction in that they both would comprise rotating drums or disks, so that the drum construction shown in FIGS. 6, 7 and 8 is applicable not only to the charging generator, but also to the main generator of the type shown in my said co-pending application Serial No. 713,050.

Having thus described the principles of my invention, together with illustrative embodiments thereof, it is to be understood that although specific terms are employed, they are used in a generic and descriptive sense, and not for purposes of limitation, the scope of the invention being set forth in the following claim.

I claim:

In an electrostatic D.C. voltage generator having conductive members the capacitance between which is varied for purposes of voltage generation, the improvement which comprises a first shaft; a first radially tapered disk transversely supported upon said first shaft, a first series of circumferentially segmented conductive tubular members concentrically supported upon said first disk coaxial with said first shaft; a second shaft coaxial with said first shaft, a second radially tapered disk transversely supported upon said second shaft, a series of circumferentially segmented conductive tubular members concentrically supported upon each side of said second disk coaxial with said second shaft said last named series of circumferentially segmented conductive tubular members having segments similar to those of said first series of circumferentially segmented conductive tubular members but with alternate segments omitted, a third radially tapered disk transversely supported in coaxial relationship to said first shaft; a series of conductive tubular members concentrically supported upon said third disk coaxial with said first shaft, said series of circumferentially segmented conductive tubular members concentrically supported upon one side of said second disk being in interlocking relationship with said circumferentially segmented conductive tubular members of said first disk member and said series of circumferentially segmented conductive tubular members concentrically supported upon the other side of said second disk being in interlocking relationship with said series of conductive tubular members concentrically supported upon said third disk members, and means for rotating said second shaft, whereby the capacitance between said first series of circumferentially segmented conductive tubular members and said series of conductive tubular members is varied.

References Cited in the file of this patent

UNITED STATES PATENTS

| | | |
|---|---|---|
| 1,435,210 | Chubb | Nov. 14, 1922 |
| 2,194,839 | Van de Graaff et al. | Mar. 26, 1940 |
| 2,567,373 | Giacoletto et al. | Sept. 11, 1951 |
| 2,843,767 | Whitlock | July 15, 1958 |
| 3,013,201 | Goldie | Dec. 12, 1961 |

FOREIGN PATENTS

| | | |
|---|---|---|
| 548,138 | Canada | Oct. 29, 1957 |